(12) United States Patent
Wang et al.

(10) Patent No.: US 11,003,523 B2
(45) Date of Patent: May 11, 2021

(54) DATABASE OPTIMIZED DISASTER RECOVERY TESTING

(71) Applicant: International Business Machines Corporation, Armonk, NY (US)

(72) Inventors: Long Wang, Yorktown Heights, NY (US); Ruchi Mahindru, Elmsford, NY (US); Soumitra Sarkar, Cary, NC (US); Yu Deng, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 16/431,728

(22) Filed: Jun. 4, 2019

(65) Prior Publication Data

US 2020/0387417 A1    Dec. 10, 2020

(51) Int. Cl.
*G06F 11/00* (2006.01)
*G06F 11/07* (2006.01)
*G06F 16/23* (2019.01)

(52) U.S. Cl.
CPC ........ *G06F 11/079* (2013.01); *G06F 11/0745* (2013.01); *G06F 11/0751* (2013.01); *G06F 11/0787* (2013.01); *G06F 16/2365* (2019.01)

(58) Field of Classification Search
CPC .............. G06F 11/079; G06F 11/0745; G06F 11/0751; G06F 11/0787; G06F 11/3006; G06F 11/3051; G06F 11/2247; G06F 11/2289
See application file for complete search history.

(56) References Cited

U.S. PATENT DOCUMENTS

| | | |
|---|---|---|
| 2018/0157700 A1 | 6/2018 | Roberts et al. |
| 2018/0253320 A1 | 9/2018 | Emejulu et al. |
| 2018/0255090 A1 | 9/2018 | Kozloski et al. |
| 2018/0255130 A1 | 9/2018 | Kozloski et al. |
| 2018/0315055 A1 | 11/2018 | Pickover et al. |
| 2019/0334807 A1* | 10/2019 | Clark .................. H04L 41/0873 |

(Continued)

OTHER PUBLICATIONS

List of IBM Patents or Patent Applications Treated as Related, Jun. 11, 2019.

(Continued)

*Primary Examiner* — Philip Guyton

(57) ABSTRACT

An example operation may include one or more of receiving, by a disaster recovery orchestrator, configuration changes independent from a disaster recovery test schedule, from one or more monitoring agents at each of an information technology system, analyzing incremental configuration changes since a previous disaster recovery test for potential to limit a need for unnecessary disaster recovery retest, determining component level changes at each information technology system that impact disaster recovery test readiness, initiating a partial disaster recovery retest without regard to periodic disaster recovery test schedules, in response to incremental configuration changes that are at the information technology system component-level, and invoking a blockchain service to generate blockchain transactions, the blockchain transactions committing configuration changes, disaster recovery testing actions, and disaster recovery testing results to a shared ledger of a blockchain network.

20 Claims, 17 Drawing Sheets

(56) References Cited

U.S. PATENT DOCUMENTS

2020/0174912 A1* 6/2020 Sanghvi .............. G06F 11/3457
2020/0327030 A1* 10/2020 Zhang .................... H04L 43/50
2020/0387417 A1* 12/2020 Wang .................. G06F 11/0787

OTHER PUBLICATIONS

Long Wang et al. "Database Optimized Disaster Recovery Orchestrator", U.S. Appl. No. 16/431,732, filed Jun. 4, 2019 (a copy is not provided as this application is available to the Examiner).
Bae, "An Automated System Recovery Using BlockChain," 2018 Tenth International Conference on Ubiquitous and Future Networks (ICUFN), Prague, 2018, pp. 897-901.
Muzammal, "Renovating blockchain with distributed databases: An open source system,Future Generation Computer Systems," vol. 90, 2019, pp. 105-117.
Wang, "Disaster Recovery for Cloud-Hosted Enterprise Applications," 2016 IEEE 9th International Conference on Cloud Computing (CLOUD), San Francisco, CA, 2016, pp. 432-439.
Wang, "Experiences with Building Disaster Recovery for Enterprise-Class Clouds," 2015 45th Annual IEEE/IFIP International Conference on Dependable Systems and Networks, Rio de Janeiro, 2015, pp. 231-238.

* cited by examiner

640

DATABASE OPTIMIZED DISASTER RECOVERY TESTING

TECHNICAL FIELD

This application generally relates to efficiencies in disaster recovery testing, and more particularly, to database optimized disaster recovery testing.

BACKGROUND

A centralized database stores and maintains data in a single database (e.g., a database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage. As such, what is needed is a solution that overcomes these drawbacks and limitations.

SUMMARY

One example embodiment provides a system that includes a system, which includes a blockchain network, comprising one or more of a shared ledger, one or more information technology systems protected by disaster recovery services, each comprising one or more monitoring agents, and a disaster recovery orchestrator, configured to perform one or more of receive configuration changes independent from a disaster recovery test schedule, from the one or more monitoring agents at each information technology system, analyze incremental configuration changes since a previous disaster recovery test for potential to limit a need for unnecessary disaster recovery retest, determine component level changes at each information technology system that impact disaster recovery test readiness, initiate a partial disaster recovery retest without regard to periodic disaster recovery test schedules, in response to incremental configuration changes that are at the information technology system component-level, and invoke a blockchain service to generate blockchain transactions to commit configuration changes, disaster recovery test actions, and disaster recovery test results to the shared ledger.

Another example embodiment provides a method that includes one or more of receiving, by a disaster recovery orchestrator, configuration changes independent from a disaster recovery test schedule, from one or more monitoring agents at each of an information technology system, analyzing incremental configuration changes since a previous disaster recovery test for potential to limit a need for unnecessary disaster recovery retest, determining component level changes at each information technology system that impact disaster recovery test readiness, initiating a partial disaster recovery retest without regard to periodic disaster recovery test schedules, in response to incremental configuration changes that are at the information technology system component-level, and invoking a blockchain service to generate blockchain transactions, the blockchain transactions committing configuration changes, disaster recovery testing actions, and disaster recovery testing results to a shared ledger of a blockchain network.

A further example embodiment provides a non-transitory computer readable medium comprising instructions, that when read by a processor, cause the processor to perform one or more of receiving, by a disaster recovery orchestrator, configuration changes independent from a disaster recovery test schedule, from one or more monitoring agents at each of an information technology system, analyzing incremental configuration changes since a previous disaster recovery test for potential to limit a need for unnecessary disaster recovery retest, determining component level changes at each information technology system that impact disaster recovery test readiness, initiating a partial disaster recovery retest without regard to periodic disaster recovery test schedules, in response to the incremental configuration changes that are at the information technology system component-level, and invoking a blockchain service to generate blockchain transactions, the blockchain transactions committing configuration changes, disaster recovery testing actions, and disaster recovery testing results to a shared ledger of a blockchain network.

DETAILED DESCRIPTION

Figure 1:
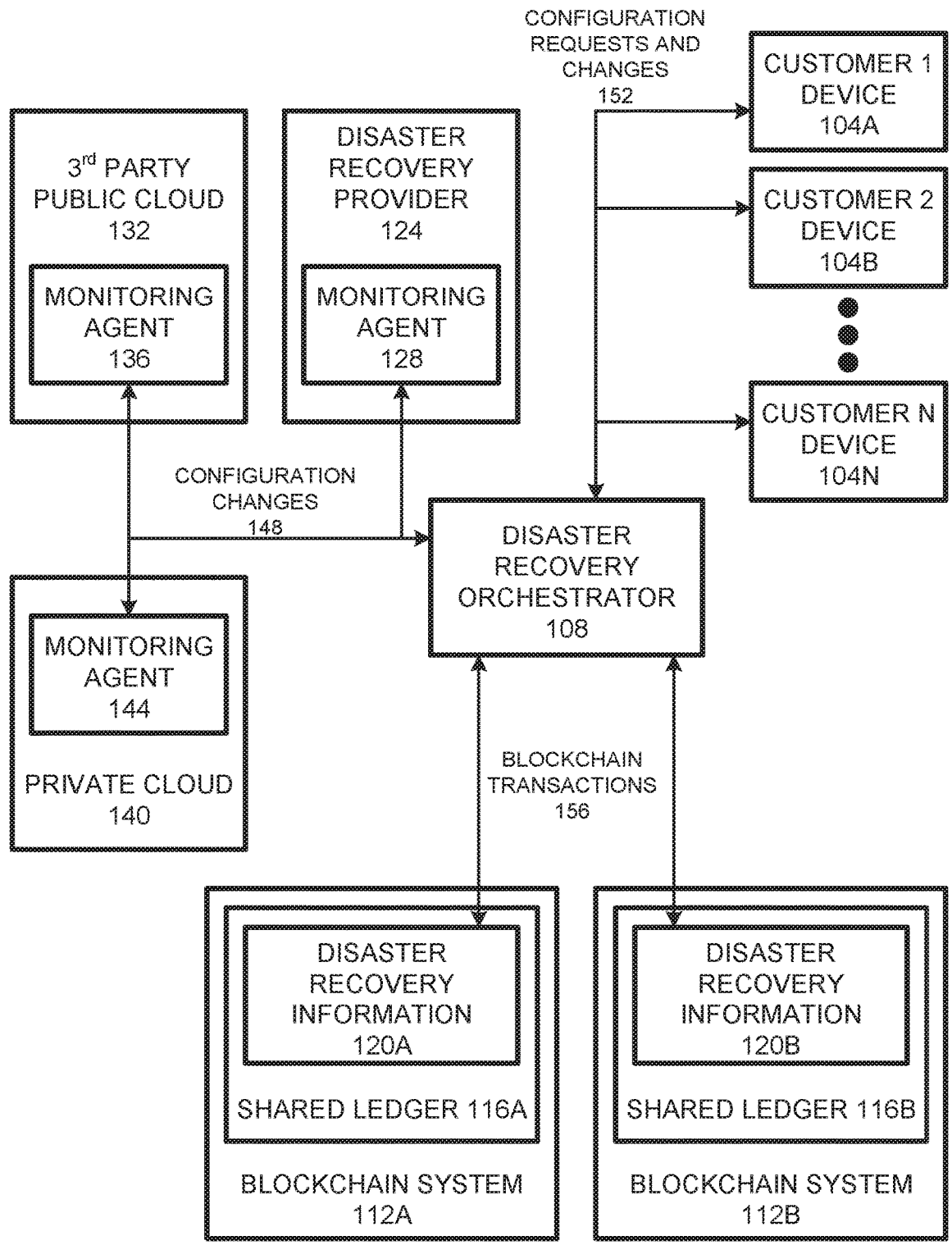
FIG. 1 illustrates a block diagram of a disaster recovery testing system in a database, according to example embodiments.

It will be readily understood that the disclosed components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The disclosed features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, which provide efficiency improvements for disaster recovery testing.

In one embodiment the application utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains often involve native cryptocurrency and use consensus based on various protocols such as Proof of Work (PoW). On the other hand, a permissioned blockchain database provides secure interactions among a group of entities which share a common goal but which do not fully trust one another, such as businesses that exchange funds, goods, information, and the like.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This application can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This application can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This application can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include support for partial disaster recovery testing, improved timeliness for disaster recovery testing, support for configuration rollback, and justification for disaster recovery retesting. Partial disaster recovery testing saves time and testing cost by testing a subset of a dataset, instead of a complete dataset in all cases. Improved timeliness for disaster recovery testing or retesting is improved by identifying all incremental changes that may necessitate disaster recovery configuration retest. By rolling back certain configurations, expensive disaster recovery retesting may be mitigated—especially for configurations providing little value to operations. Any disputes with disaster recovery customers may be resolved by analyzing shared ledger contents to justify a need for a retest. In the preferred embodiment, recording of electronic approvals or rejections of disaster recovery orchestrator-initiated disaster recovery testing proposals by the customer are recorded as blockchain transactions, in order to aid dispute resolution if required.

Disaster Recovery testing operations on most components are typically disruptive (to the customer), and require cooperation across multiple components and groups (people). Once a disaster recovery configuration is set up, it acts in the background with minimal intrusion/disruption to ensure that data and system recovery is smooth in case a disaster occurs. In that context, disaster recovery operations are not disruptive. However, disaster recovery testing operations can be disruptive to the customer's steady state operations, since they involve simulating a disaster and examining the automated recovery operations. Disaster recovery testing is also expensive to perform and an additional cost to the customer. Therefore, consensus regarding each DR (disaster recovery) testing operation is critical. The present application requires use of an immutable and consistent shared ledger to record all actions related to configuration changes that may or may not warrant disaster recovery (re)testing, as well as key actions related to testing. The need for such (re)testing involves agreement (consensus) across multiple parties, minimally the disaster recovery service provider tools and the disaster recovery service consumer (the customer).

While a traditional database can be used to record all actions taken by various parties and software agents related to disaster recovery testing, a traditional database cannot replace an immutable shared ledger that is critical for resolving any disputes/disagreements regarding historical actions.

The present application describes a functional improvement to traditional disaster recovery testing methodology. It utilizes the consensus mechanism provided by blockchains immutable shared ledger feature to add consensus guarantees to disaster recovery operations, where consensus across multiple parties is critical. As a result, an automated, online, dynamic, partial disaster recovery retest may be provided without depending on contractual schedules or manual planning.

The present application stores the following information in a per-customer immutable ledger provisioned by the disaster recovery provider. This information includes, but is not limited to, configuration changes detected by monitoring agents at different layers of a (Cloud) software stack, decisions by an enhanced/intelligent disaster recovery orchestrator (DRO) to perform (re)test as a result of monitoring agent notifications, record of (re)test start, (re)test end, (re) test success, and (re)test failure. Shared ledger entries enable disaster recovery (re)test to be implemented correctly and handle dispute resolutions while providing optimized disaster recovery operations. The present application does not involve creating new blockchain primitives, data structures, or protocols.

In a complex Information Technology (IT) environment, there are many servers, storage systems, switches, and applications, which can affect the resiliency of the environment with regard to protecting the data when a disaster occurs. It is very hard for a human (or humans) to manually track changes across the layers of a complex IT environment to determine when the disaster recovery setup needs to be updated because most IT environments are too complicated, and any human tracking would be error-prone. For this reason alone, organizations resort to periodic testing (contractually stipulated), so that we do not have to depend on human tracking and analysis to determine when disaster recovery testing should be performed. The present application solves the above problem with software agent-based tracking of configuration changes in real time, and an advanced disaster recovery orchestrator component to determine when disaster recovery (re)testing is required. This improves system dependability and reduces cost (of human labor).

FIG. 1 illustrates a block diagram of a disaster recovery testing system in a database, according to example embodiments. Disaster recovery testing ensures that if a disaster actually occurs at a customer site, the mechanisms set in place to protect the data will actually work. Configuration changes in the customer environment may result in the disaster recovery mechanisms in place to become ineffective. Periodic testing is required in order to ensure that when an actual disaster occurs, the data protection and recovery mechanisms will work properly. Without periodic testing in conventional environments, customers may face critical data loss when an actual disaster occurs. However, even periodic testing may be insufficient because between a last periodic test and a real disaster, a configuration change may have occurred which causes the disaster recovery mechanism to become ineffective.

In a standard disaster recovery configuration, there is a primary site running customer applications and a backup site where data may be restored if the primary site has a disaster. When a disaster recovery test is performed a "mock disaster" is emulated, and both primary and backup sites are involved in the test. Many monitoring agents may be required in many layers of the customer IT infrastructure (HW and SW) to detect configuration changes that may warrant a disaster recovery retest.

Referring to FIG. 1, a network 100 includes one or more blockchain systems 112, a disaster recovery orchestrator 108, a disaster recovery provider 124, a $3^{rd}$ party public cloud 132, a private cloud 140, and one or more customer devices 104. Two blockchain systems 112 are represented in FIG. 1, shown as blockchain systems 112A and 112B. Although two blockchain systems 112 are shown, it should be understood there may be any number of blockchain systems 112 in a disaster recovery system 100. In one embodiment, each blockchain system 112 may be a separate blockchain network. Blockchain systems 112 may be individually either a permissioned or a public blockchain system 112. The intent of the disclosed embodiments are to provision a blockchain system for use explicitly by one customer of a disaster recovery service provider 124.

Each blockchain system 112 includes a shared ledger 116, identified as shared ledger 116A for blockchain system 112A, and shared ledger 116B for blockchain system 112B. Each shared ledger 116 may include disaster recovery information 120 related to disaster recovery testing. FIG. 1 illustrates disaster recovery information 120A included within shared ledger 116A, and disaster recovery information 120B included within shared ledger 116B. Disaster recovery information 120 includes configuration changes 148 received from monitoring agents 144, disaster recovery actions, and disaster recovery testing results.

Configuration changes 148 may reflect changes to components at disaster recovery testing sites. For example, a component-level change may add a storage volume to a disaster recovery protected file system or add a node to an application cluster that is disaster recovery-protected. Configuration changes 148 therefore need to indicate the type of change that is made as well as whether they include any component-level changes. Alternately, the disaster recovery orchestrator 108 determines which component-level changes result from configuration changes 148. In most cases, optimal disaster recovery testing only tests the part of the disaster recovery solution that is impacted by the component-level changes. Optimal testing minimizes the number of components of the disaster recovery solution that are (re)tested. For example, if ten different file systems are disaster recovery-protected, and the monitoring agents (monitoring agent 136, for example) determine that only one file system's configuration has been changed, optimal disaster recovery testing will only test disaster recovery readiness of that one file system, and not all ten file systems. Additionally, with monitoring agents 128, 136, 144 operating 24×7, such a change will be detected instantly, thus allowing the disaster recovery orchestrator 108 to analyze the need for a disaster recovery (re)test "instantly".

Configuration changes 148 include a timestamp. In the preferred embodiment, all timestamps are based on a global time base such as through NIST using a Network Time Protocol (NTP). By using a global time base, all time stamps for different configuration changes 148 can be directly compared, in order to determine the order in which configuration changes 148 are received as well as to compare to a timestamp for previous disaster recovery tests. Such comparison may be necessary in order to determine which configuration changes 148 are incremental configuration changes 148 since a last disaster recovery test. In most cases, the incremental configuration changes 148 need to be tested to establish disaster recovery system 100 integrity.

A disaster recovery provider 124 conducts disaster recovery testing within the disaster recovery system 100, under the direction of the disaster recovery orchestrator 108. A disaster recovery provider 124 includes any organization (e.g., IBM Global Technology Services (GTS)/Resiliency Services group) can be a disaster recovery provider. The disaster recovery provider 124 creates the monitoring agents 128, 136, 144 that run on physical servers, virtual servers which run on local physical servers, or are provisioned on a public cloud where the physical servers are not owned by the customer. The disaster recovery provider 124 includes a monitoring agent 128, which monitors and reports configuration changes 148 associated with the disaster recovery provider 124.

Monitoring agents 128, 136, 144 run on information technology systems that are a unit of protection using disaster recovery services (i.e., storage systems, server clusters, servers, etc.). Monitoring agents 128, 136, 144 monitor any change that adversely impacts disaster recovery readiness. All agent "findings" are recorded in an immutable, secure shared ledger to justify disaster recovery testing or non-testing at any checkpoint. Intelligence is added to existing disaster recovery orchestrator technology to enable disaster recovery test schedules and test planning. Blockchain technology beneficially adds fault tolerance (distributed consensus) and ledger immutability. Using the combination of an immutable shared ledger (as provided by Blockchain), customized monitoring agents 128, 136, 144 at different layers of a software stack, and extensions to existing disaster recovery functionality, the state of the art in disaster recovery testing in blockchain environments may be greatly improved. Open source monitoring systems such as NAGIOS and ICINGA as well as IBM's Tivoli Monitoring solution may use such agents. Monitoring agents 128, 136, 144 may detect a configuration change important for disaster recovery test-readiness. The monitoring agent 128, 136, 144 may use an operating system-based technique to detect an operating system-level change (e.g., a new storage volume was added to an existing file system in a server). The monitoring agent 128, 136, 144 may also use a middleware- or application-specific interface to detect configuration changes which can affect disaster recovery test readiness.

Creating the monitoring agents 128, 136, 144 usually requires relevant expertise (e.g. experts on backup service, experts on individual middleware, etc.) and the disaster recovery expertise (e.g. disaster recovery architecture, disaster recovery plan author) to identify the right changes that potentially affect the disaster recovery behavior and should be monitored. For example, monitoring agents on client virtual machines may monitor new software installation, patch installation, etc. on the client virtual machines, monitoring agents on client virtual machines may monitor changes of volume sizes, volume types, number of processors or memory of the client virtual machines, etc., monitoring agents on client virtual machines may monitor changes of certain configurations of specific middleware (e.g. database, runtime, etc.), monitoring agents on disaster recovery infrastructures may monitor changes of disaster recovery hardware and software (including use of different type of hardware, volumes with different speed/performance, networks with different bandwidths or types, different replication mechanisms/software, changes of automation scripts for disaster recovery use cases, etc.), monitoring agents on the source site architecture that monitor changes of other services and basic capabilities that are identified to potentially affect disaster recovery behavior (e.g. backup service which may share the physical network and network bandwidth with disaster recovery), high availability services, monitoring services, changed/new security policies, security services, changes of Lightweight Directory Active Protocol (LDAP)/Active Directory, etc.), or monitoring agents on a disaster recovery site that monitors changes of the hardware and software at the disaster recovery site (e.g. change of the volumes in the disaster recovery cloud, major upgrades of the provisioning service in the disaster recovery cloud, simplified management of images/templates, changed/new security policies, changes of Lightweight Directory Active Protocol (LDAP)/Active Directory, etc.).

One or more $3^{rd}$ party public clouds 132 may be present within the disaster recovery network 100. $3^{rd}$ party public cloud 132 may be created by a separate cloud provider (e.g., Amazon), and only the virtual resource (virtual machines) are "owned" by a customer, and include a monitoring agent 136, which monitors and reports configuration changes 148 associated with the $3^{rd}$ party public cloud 132.

One or more private clouds 140 may be present within the disaster recovery network 100. Private cloud 140 may be created using physical machines and virtualization technology that is completely owned by one company (e.g., a customer may host a private cloud 140 instance in a customer-owned data center), and includes a monitoring agent 144, which monitors and reports configuration changes 148 associated with the private cloud 140.

One or more customer devices 104 may be present in the disaster recovery testing system 100. Three customer devices 104 are shown, identified as customer 1 device 104A, customer 2 device 104B, and customer N device 104N. A customer (e.g. a customer data center) who signs a contract to provide disaster recovery services with a provider to protect their data center is a disaster recovery consumer. The disaster recovery consumer purchases a contract for providing disaster recovery service for a set of hardware and software components in a data center. Customer devices 104 may be any type of computing device, including servers, desktop computers, mobile computers, portable computers, smart phones, PDAs, wearable computers, or implantable computers. The disaster recovery orchestrator 108 sends and receives configuration requests and changes 152 and disaster recovery testing approvals to/from each of the customer devices 104.

The disaster recovery orchestrator 108 is an intelligent automation system that coordinates the management and operations of individual software components which comprise a disaster recovery solution. The disaster recovery orchestrator 108 may be used to analyze a disaster recovery configuration, determine automatically which component-level changes would impact the test-readiness of that configuration, and take as input a set of configuration changes that impact a disaster recovery configuration and determine the optimal amount of retesting required (thus avoiding a full retest). For example, if there are one hundred components in a resilient system for a customer but only twenty are impacted by a configuration change 148 (e.g., addition of a storage volume to a virtual machine's file system mounted on a physical machine), the enhanced disaster recovery orchestrator may create an optimal test plan. The present application defines disaster recovery configuration change tracker monitoring agents 128, 136, 144 that collaborates with a disaster recovery orchestrator 108 to determine what specific configuration changes 148 to track on a given system (e.g., server, virtual machine, management software, etc.). This defines what (configuration change) operations to record in an immutable shared ledger 116. The technology used by the agents 128, 136, 144 to track important configuration changes 148 may be operating system-specific (e.g., track any modification to a list of named files in real time, or periodically take system-level snapshots using "XYZ system" and compute the snapshot differences).

The disaster recovery orchestrator 108 receives configuration changes 148 from monitoring agents 144, specifies configuration changes to monitor, performs disaster recovery configuration change analysis, interacts with customer devices 104, stores disaster recovery information 120 with blockchain transactions 156, and retrieves disaster recovery information 120 with blockchain transactions 156. Because the disaster recovery orchestrator 108 initiates incremental disaster recovery testing based on incremental configuration changes 148, the incremental disaster recovery testing is referred to as a partial disaster recovery retest. Partial disaster recovery testing or retesting involves retesting only part of the entire disaster recovery configuration for a customer. It is cheaper to test a few components of a complex disaster recovery configuration, as opposed to testing the entire configuration due to a small change.

The disaster recovery orchestrator 108 record various events to the shared ledger 116 of the blockchain network 100. These events include, but are not limited to: configuration changes reported by monitoring agents 128, 136, 144, an inference that this requires a full or a partial disaster recovery retest, a notification to a customer and subsequent approval or rejection of a retest request, performance of a retest subject to approval on the notification, a result of a retest, a notification of a result and subsequent action recommendation to a customer if a retest is failed, a customer response to a notification if a retest is failed, and a result of an action taken by a disaster recovery orchestrator 108 if a customer response results in an actionable response by the system. A full disaster recovery test plan is typically included in a disaster recovery contract.

One of the benefits of using a secure Hyperledger provided by a blockchain network 100 is traceability which can aid in dispute resolution. For example, a customer may change their mind and may want to reverse a decision about disaster recovery testing or not performing disaster recovery testing, after a testing (or not testing) decision has been already acted upon by the disaster recovery orchestrator 108. For example, a disaster recovery orchestrator 108 may suggest a disaster recovery retest due to configuration changes, customer declines, a disaster occurs, data recovery fails, there is some data loss, or a customer is unhappy. The Hyperledger entries may "prove" that the disaster recovery orchestrator 108 in conjunction with the disaster recovery service provider 124 (e.g., IBM) acted correctly. In another example, a disaster recovery orchestrator 108 may suggest a disaster recovery retest due to configuration changes, customer acceptance, or disaster recovery testing completed. When the customer is billed, the customer may dispute the charges. The Hyperledger entries will show the trail of events to assist in dispute resolution.

The disaster recovery orchestrator 108 includes extensions to utilize instances of a blockchain service. The blockchain service is used to record and access configuration changes, disaster recovery testing actions, and disaster recovery testing results to/from shared ledgers 116 in blockchain systems 112. The blockchain service may maintain different customer states for different customers (i.e. customer 1 104A, customer 2 104B, customer N 104N) in different blockchain networks or systems 112A, 112B where different Hyperledgers may be maintained. In a preferred embodiment, the blockchain service may include IBM Bluemix technology. IBM Bluemix is a cloud platform as a service developed by IBM. It supports several programming languages and services as well as integrated DevOps to build, run, deploy and manage applications on the cloud. IBM Bluemix is based on Cloud Foundry open technology and runs on a SoftLayer infrastructure.

In some cases, a customer may be advised to roll back some configuration changes 148 that may result in expensive disaster recovery retesting while providing limited value to the customer's operations. If the configuration changes 148 which would require extensive retesting are not valuable to the customer, the feedback provided by the disaster recovery orchestrator 108 may convince the customer to not apply the changes, and thereby save money. A customer may want to save money by pushing back on extra retesting before a contracted disaster recovery test schedule, and including the customer in partial disaster recovery retest decisions facilitates that. In other embodiments, a customer may be advised to roll back some configuration changes 148 that may result in longer disaster recovery retesting while providing limited value to the customer's operations. Such feedback provided by the disaster recovery orchestrator 108 may also be valuable to a customer if the customer has an upcoming seasonal peak or another event due to which disaster recovery retesting can be interfering or impacting their business transactions. In that case, the customer may choose to refuse the retesting or may choose the retesting Automation is required in disaster recovery management because there are stringent Recovery Point Objective (RPO)/Recovery Time Objective (RTO) requirements for disaster recovery, and a human cannot track the impact of system changes in a timely manner in order to keep the disaster recovery system consistent. A Recovery Point Objective is a maximum targeted period in which data might be lost from an IT service due to a major incident or disaster. A Recovery Time Objective is a targeted duration of time within which a business process must be restored after a disaster (or disruption) in order to avoid unacceptable consequences associated with a break in business continuity. Advantageously, the present application describes a disaster recovery readiness checker that creates an automated and secure solution to ensure that a customer's disaster recovery environment is always ready to handle a disaster.

Figure 2A:
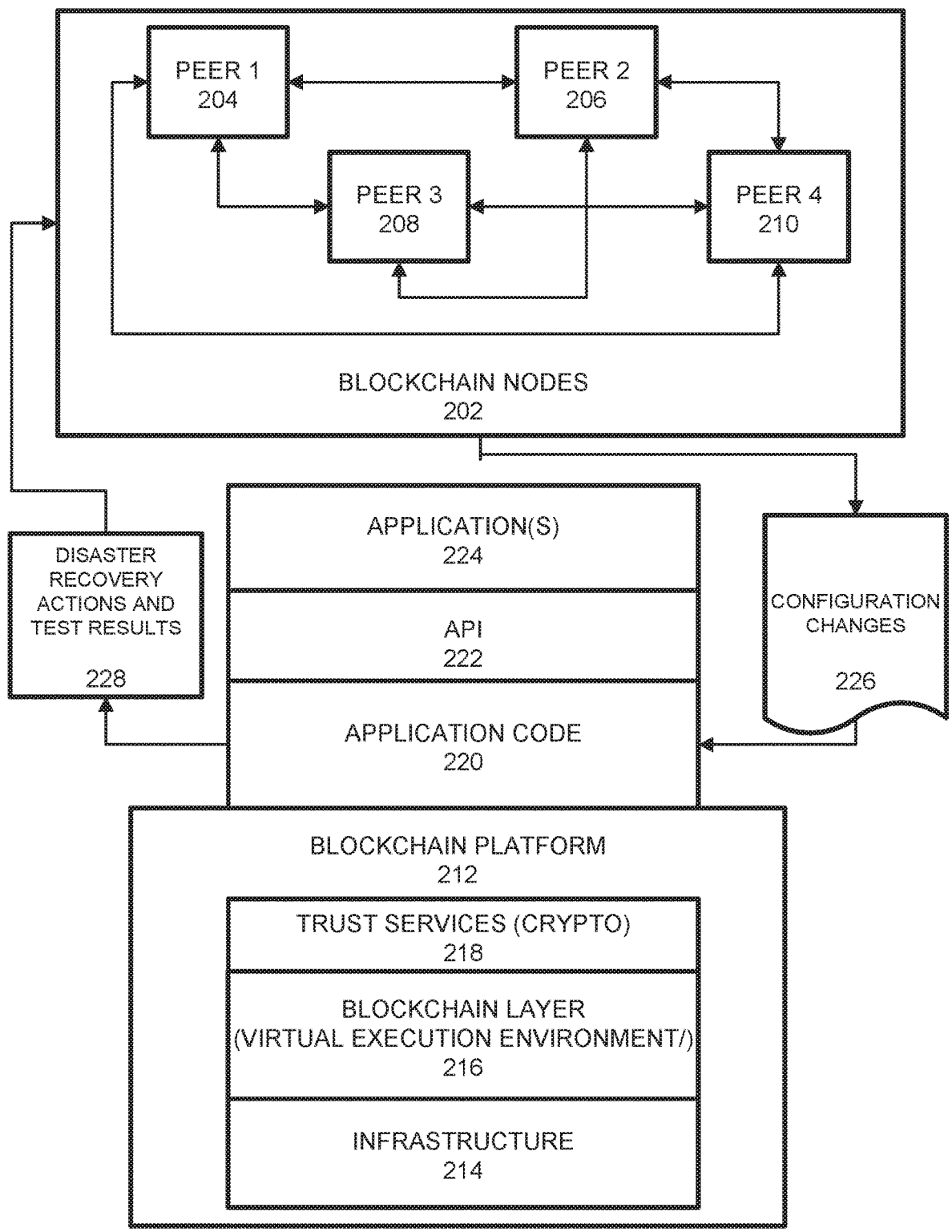
FIG. 2A illustrates an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 226 may include configuration changes from monitoring agents, and may be processed by one or more processing entities (e.g., virtual machines) included in the blockchain layer 216. The result 228 may include blockchain transactions from a blockchain service that stores disaster recovery actions, configuration changes reported to the disaster recovery orchestrator by the monitoring agents, and test results to the shared ledger. All transactions written to the blockchain network by an application can be read back by the application at a later time. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
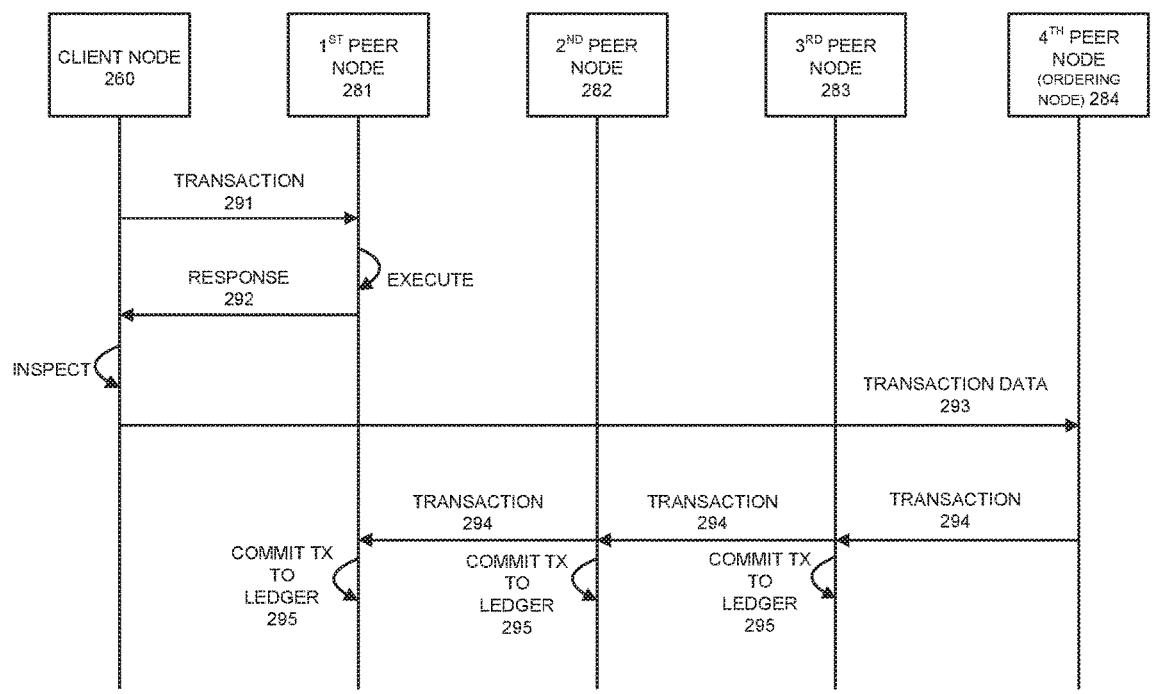
FIG. 2B illustrates a blockchain transactional flow, according to example embodiments.

FIG. 2B illustrates an example of a blockchain transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3A:
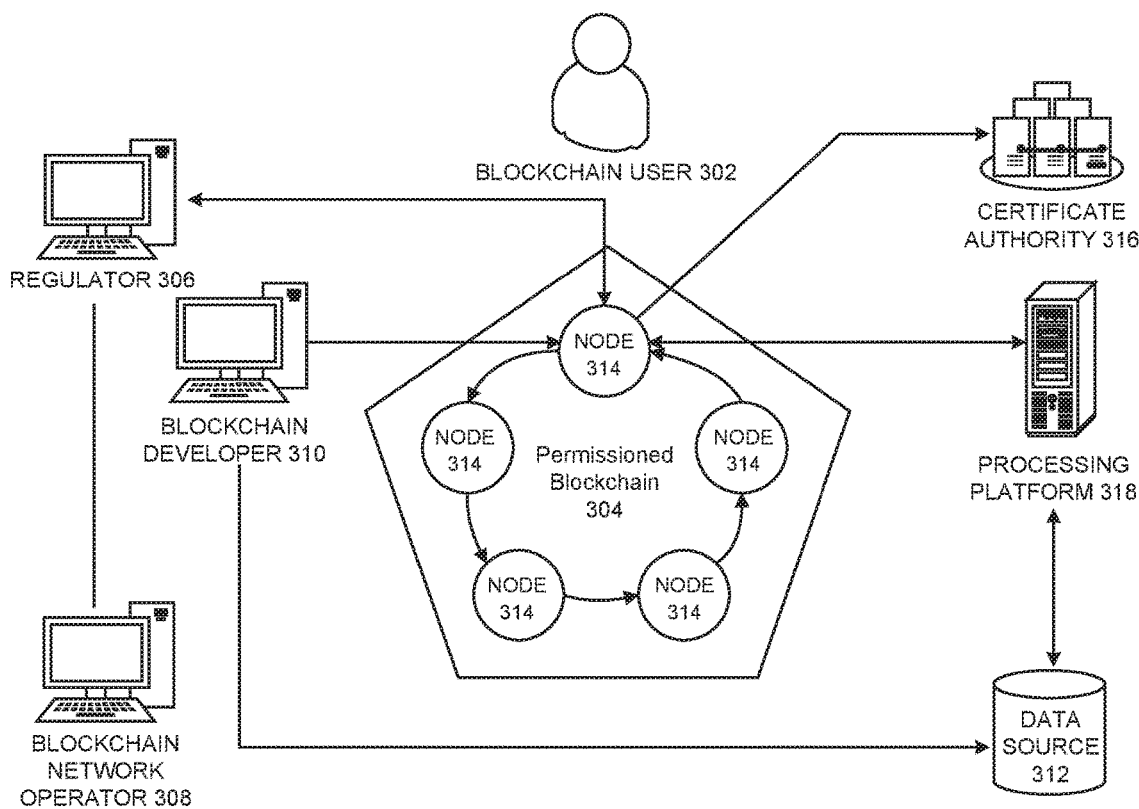
FIG. 3A illustrates a permissioned network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
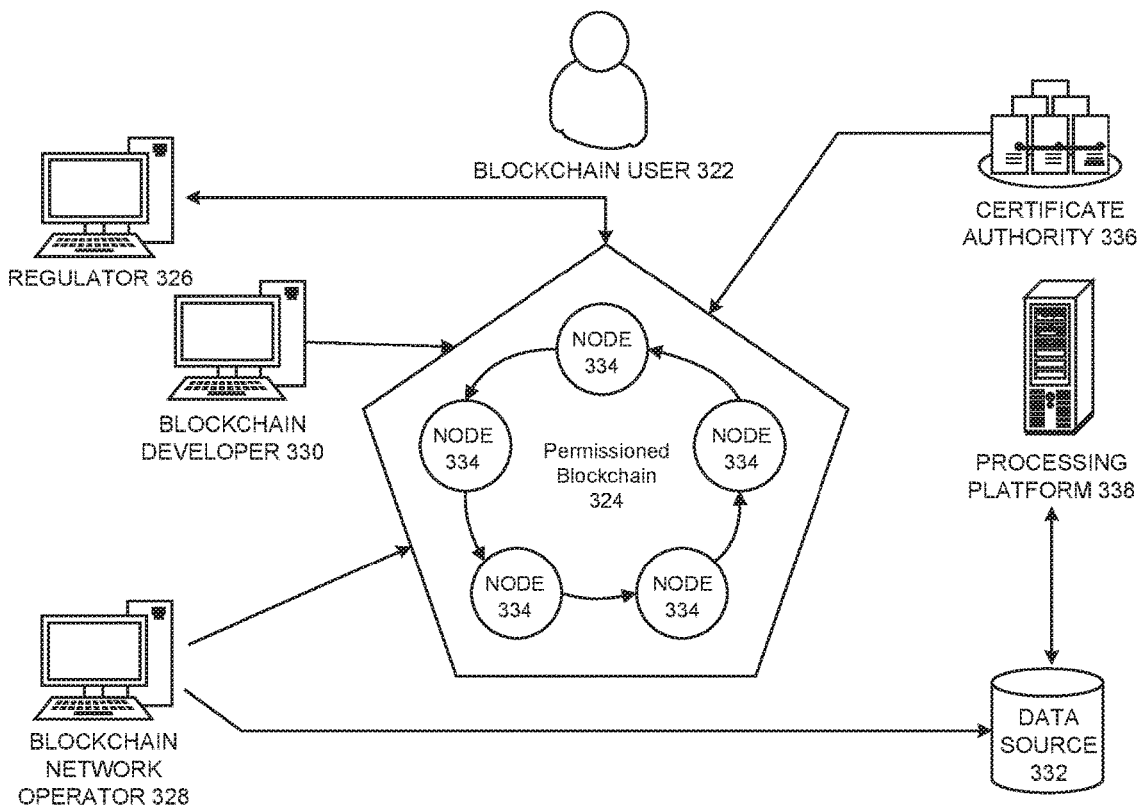
FIG. 3B illustrates another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

Figure 4:
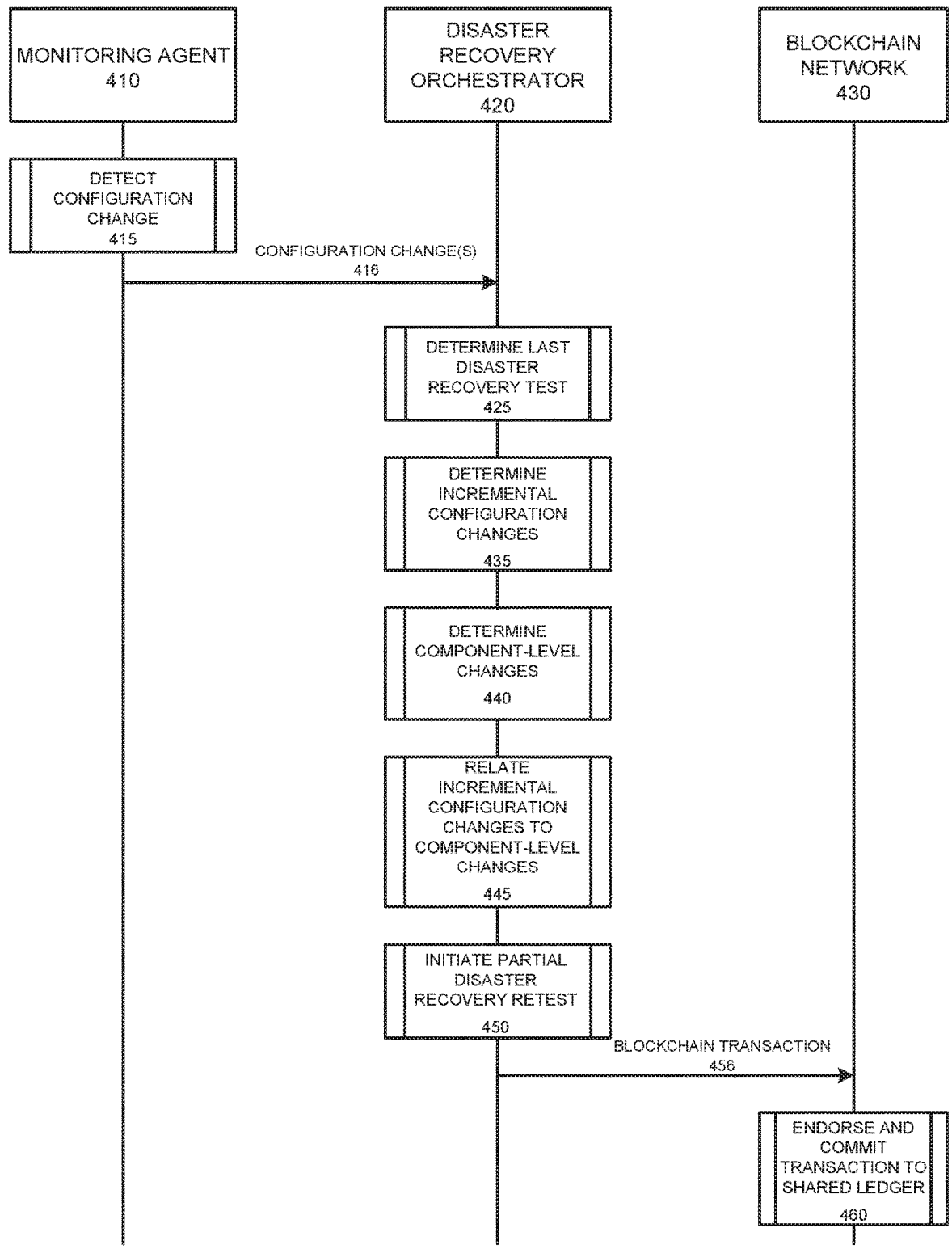
FIG. 4 illustrates a system messaging diagram, according to example embodiments.

FIG. 4 illustrates a system messaging diagram 400 for performing partial disaster recovery testing, according to example embodiments. Referring to FIG. 4, the system diagram 400 includes a monitoring agent 410, a disaster recovery orchestrator 420, and one or more blockchain networks 430.

The monitoring agent 410 detects configuration changes 415 at a primary or secondary disaster recovery site. The configuration changes may include software changes, hardware changes, added or removed components, and so forth. The monitoring agent 410 either sends configuration changes 416 individually to a disaster recovery orchestrator 420, or groups configuration changes 416 and either sends periodically (i.e. every TBD time period) or after some number of configuration changes 416 have been detected.

The disaster recovery orchestrator 420 then performs several steps in response to receiving one or more configuration changes 416. At block 425, the disaster recovery orchestrator 420 determines a timestamp for a last disaster recovery test. In one embodiment, the disaster recovery orchestrator 420 invokes a blockchain service to read the timestamp for the last disaster recovery test from a shared ledger of the blockchain network 430.

At block 435, the disaster recovery orchestrator 420 determines incremental configuration changes. Incremental configuration changes are those configuration changes 416 received since the last disaster recovery test, and therefore those configuration changes 416 have not yet been tested. The disaster recovery orchestrator 420 compares timestamps of the last disaster recovery test to the received configuration changes 416 to determine which of the configuration changes 416 are incremental configuration changes.

At block 440, the disaster recovery orchestrator 420 determines component-level changes. In one embodiment, the disaster recovery orchestrator 420 analyzes the incremental configuration changes in order to determine which are component-level changes. Component-level changes include major changes that add or remove a component, such as a storage volume, a file system, or a server.

At block 445, the disaster recovery orchestrator 420 relates the incremental configuration changes to the component-level changes. The configuration changes 416 that are related to component-level changes are in some embodiments those changes that are required to be included in the partial disaster recovery retest.

At block 450, the disaster recovery orchestrator 420 initiates a partial disaster recovery retest. In one embodiment, a disaster recovery provider conducts the retest under direction from the disaster recovery orchestrator 420. In one embodiment, the disaster recovery provider provides test results to the disaster recovery orchestrator 420.

The disaster recovery orchestrator 420 needs to securely store data items related to the disaster recovery testing or retest. The data items may include configuration changes 416, incremental configuration changes, disaster recovery actions, and any received disaster recovery testing results. The data items are provided to the blockchain network 430 in one or more blockchain transactions 456.

Upon receiving the blockchain transactions 456, the blockchain network endorses the transactions and commits the transactions to a shared ledger 460. Once committed, the data items are permanently stored and may be accessed as needed in the future. In one embodiment, multiple blockchain networks 430 and shared ledgers may be supported. In one embodiment, different disaster recovery customers may utilize different blockchain networks 430 and shared ledgers.

Figure 5A:
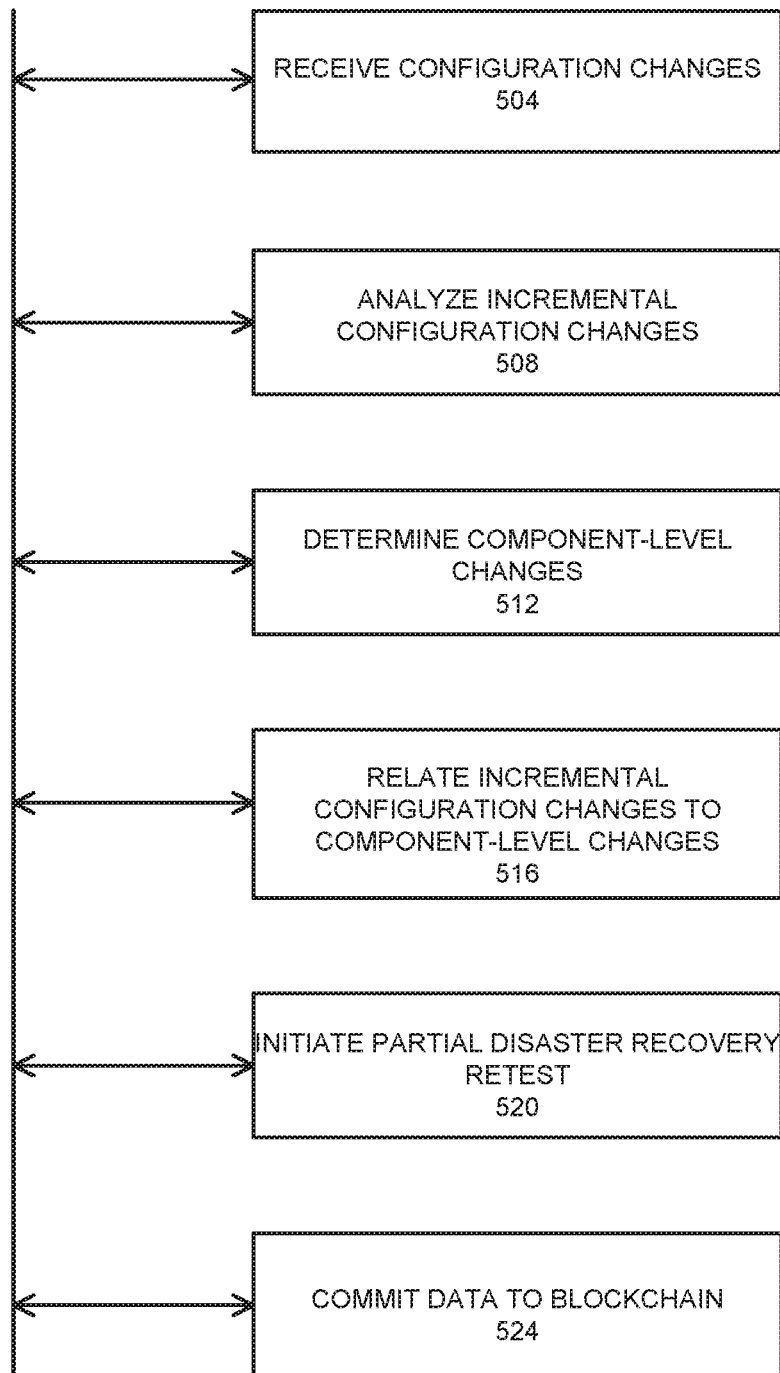
FIG. 5A illustrates a flow diagram of an example method of managing partial disaster recovery testing, according to example embodiments.

FIG. 5A illustrates a flow diagram 500 of an example method of managing partial disaster recovery testing in a blockchain, according to example embodiments. Referring to FIG. 5A, the method 500 may include one or more of the following steps.

At block 504, a disaster recovery orchestrator 108 receives configuration changes from one or more monitoring agents. In one embodiment, the monitoring agents are installed at disaster recovery primary or secondary test sites. In one embodiment, the received configuration changes are in response to an identification of which configuration changes should be reported that is sent from the disaster recovery orchestrator to the one or more monitoring agents.

At block 508, the disaster recovery orchestrator analyzes incremental configuration changes. Each received configuration change includes a timestamp indicating when a corresponding monitoring agent received or detected the configuration change. Incremental configuration changes are those configuration changes received since a last disaster recovery test, and therefore those configuration changes have not yet been tested. The disaster recovery orchestrator compares timestamps of the last disaster recovery test to the received configuration changes to determine which of the configuration changes are incremental configuration changes.

At block 512, the disaster recovery orchestrator determines component-level changes. Component-level changes include major changes that add or remove a component, such as a storage volume, a file system, or a server.

At block 516, the disaster recovery orchestrator relates configuration changes to component-level changes. In one embodiment, component-level changes may be identified by reviewing the incremental configuration changes. For example, a configuration change of "storage volume added" may be identified as a component-level change upon review.

At block 520, the disaster recovery orchestrator initiates a partial disaster recovery retest. In one embodiment, the disaster recovery orchestrator provides a notification to a disaster recovery provider to initiate the partial disaster recovery retest and what that retest consists of. The disaster recovery provider then conducts the partial disaster recovery retest, as requested.

At block 524, the disaster recovery orchestrator invokes a blockchain service to commit data to a blockchain for a blockchain network. The data may include configuration changes, disaster recovery actions, and disaster recovery test results.

Figure 5B:
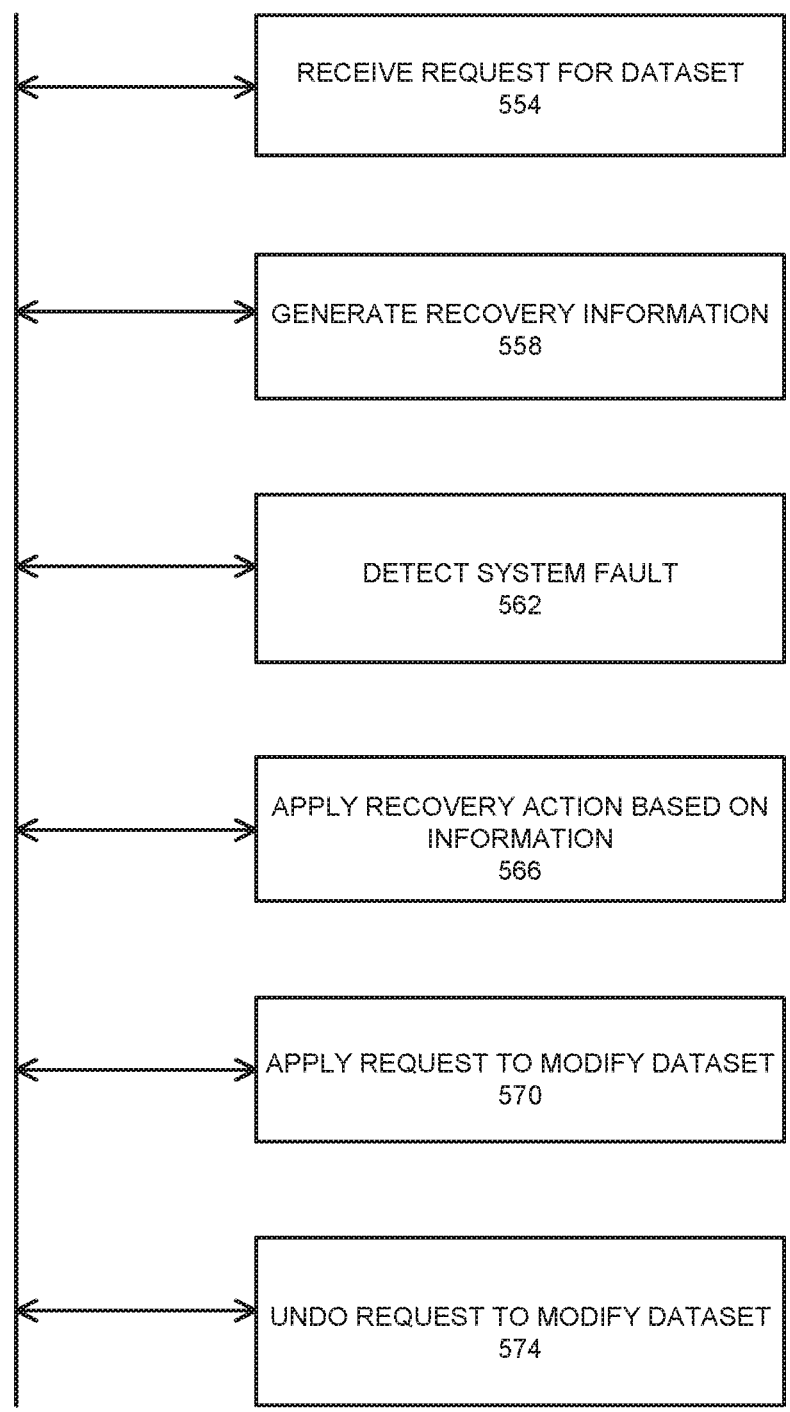
FIG. 5B illustrates an example method of recovering a dataset for a storage system, according to example embodiments.

FIG. 5B illustrates a flow diagram 550 of an example method of recovering a dataset for a storage system, according to example embodiments. Referring to FIG. 5B, the method 550 may include one or more of the following steps.

At block 554, the process includes receiving, by at least one storage system among a plurality of storage systems synchronously replicating a dataset, a request to modify the dataset.

At block 558, the process includes generating recovery information indicating whether the request to modify the dataset has been applied on all storage systems in a plurality of storage systems synchronously replicating the dataset. Generating the recovery information includes: generating recovery information by tracking progress toward applying the request to modify the dataset on the plurality of storage systems. Generating recovery information by tracking progress toward applying the request to modify the dataset on the plurality of storage systems may be implemented by using checkpointing to determine operations that are confirmed to have been processed or completed. In this way, the generated recovery information may indicate which storage systems have or have not processed or completed the request to modify the dataset.

At block 562, the process includes detecting a system fault.

At block 566, the process includes applying a recovery action in dependence upon the recovery information indicating whether the request to modify has been applied on all storage systems in the plurality of storage systems synchronously replicating the dataset.

At block 570, the process includes applying the request to modify the dataset. This may be implemented by using the recovery information from block 558 to identify the one or more storage systems on which to re-issue the request. This may include sending, for the request to modify the dataset, information describing a modification to the dataset according to the request, and completing the steps described above.

At block 574, the process includes undoing the request to modify the dataset on storage systems that did not apply the request to modify the dataset. This may be implemented by using the recovery information to identify one or more storage systems on which the request on which the request was processed or completed. Further, undoing the request may depend upon, for each storage system on which the request was completed, maintaining, on each storage system a log of changes corresponding to each request to modify the dataset, where each request to modify the dataset may further be associated with an identifier. The log may also, for each request identifier, associate a version of a metadata representation that includes a graph that represents the state of the dataset prior to applying the request identifier. In some examples, such versioning information may correspond to snapshots. As discussed above, given a virtualized representation of the dataset, and given that only differences to the metadata representation of the dataset corresponding to a particular request are stored, in addition to overwritten data by the corresponding request to modify the dataset, storage requirements for the log should be minimized. In this way, using the log, a controller of a storage system may restore a state of the dataset to a prior state before application of the request, and define a current state of the metadata representation to the prior state before application of the request.

Figure 6A:
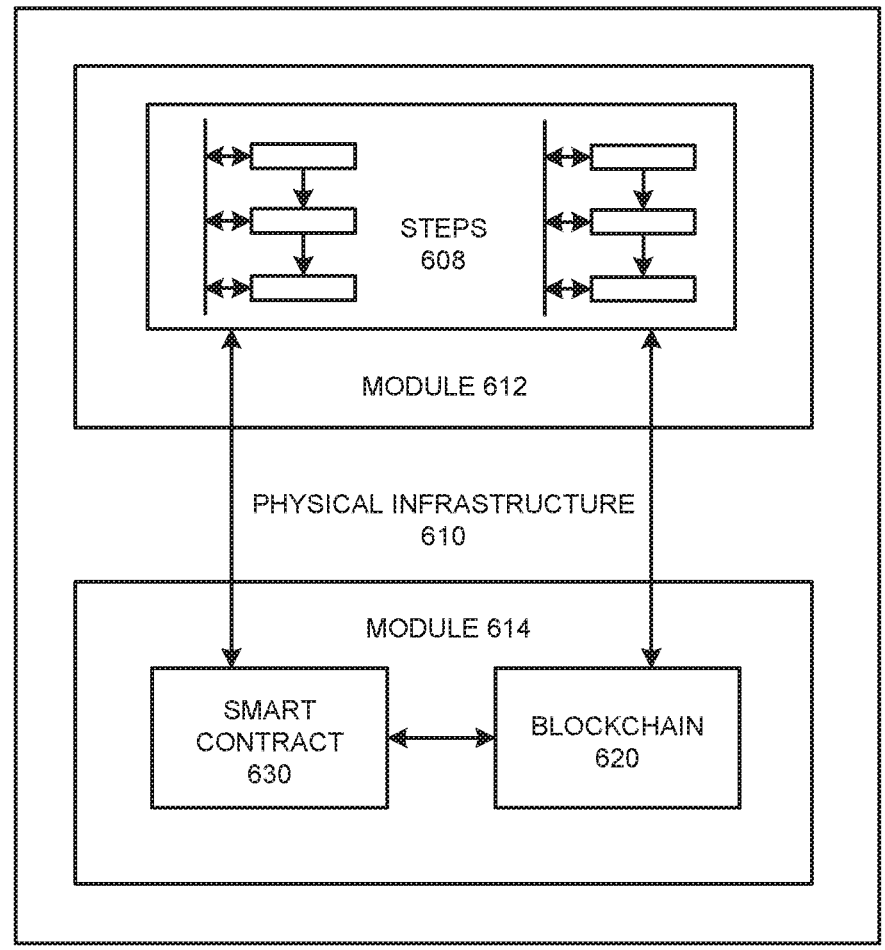
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
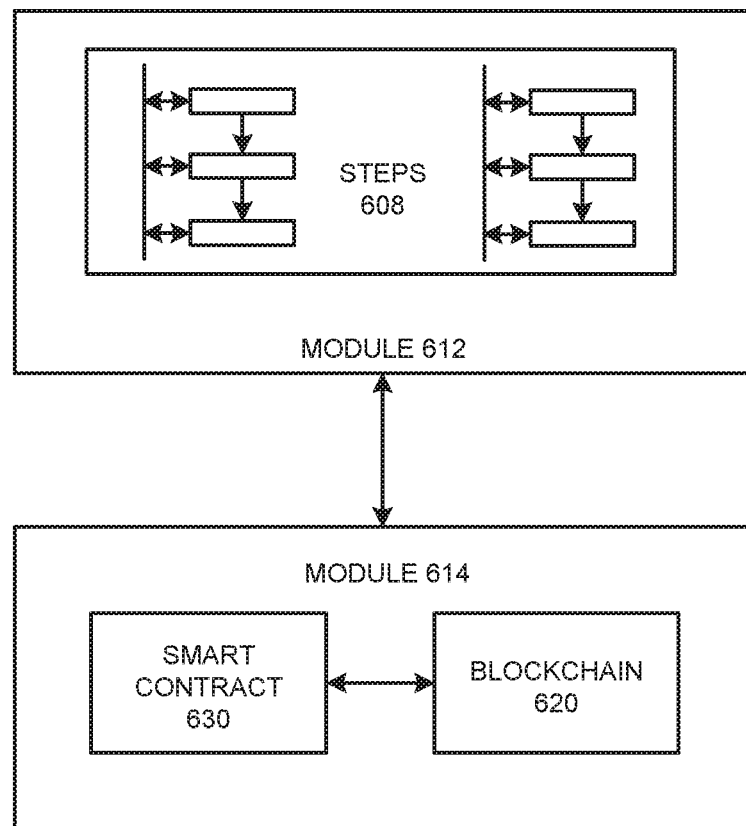
FIG. 6B illustrates another example system configured to perform one or more operations described herein, according to example embodiments.

FIG. 6B illustrates another example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
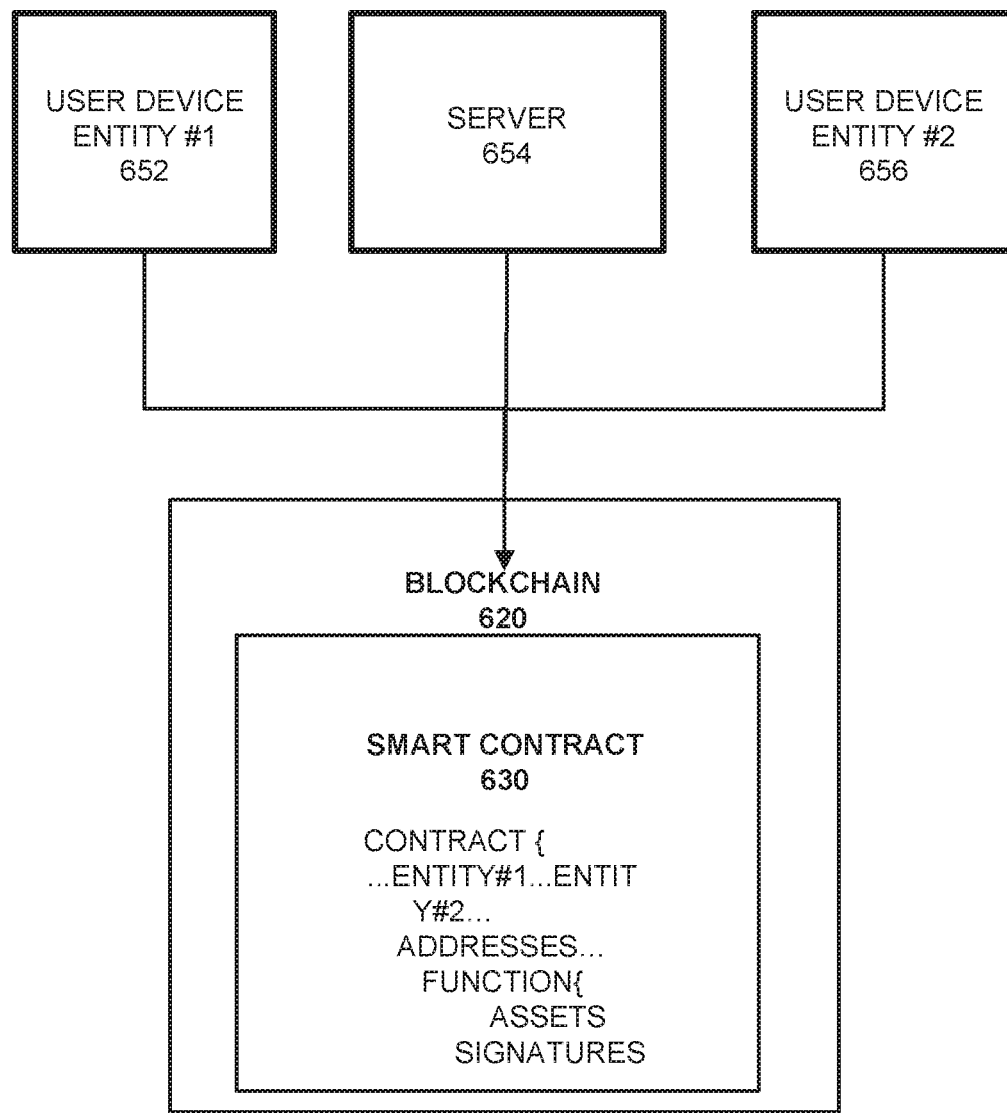
FIG. 6C illustrates a further example system configured to utilize a smart contract, according to example embodiments.

FIG. 6C illustrates an example system configured to utilize a smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
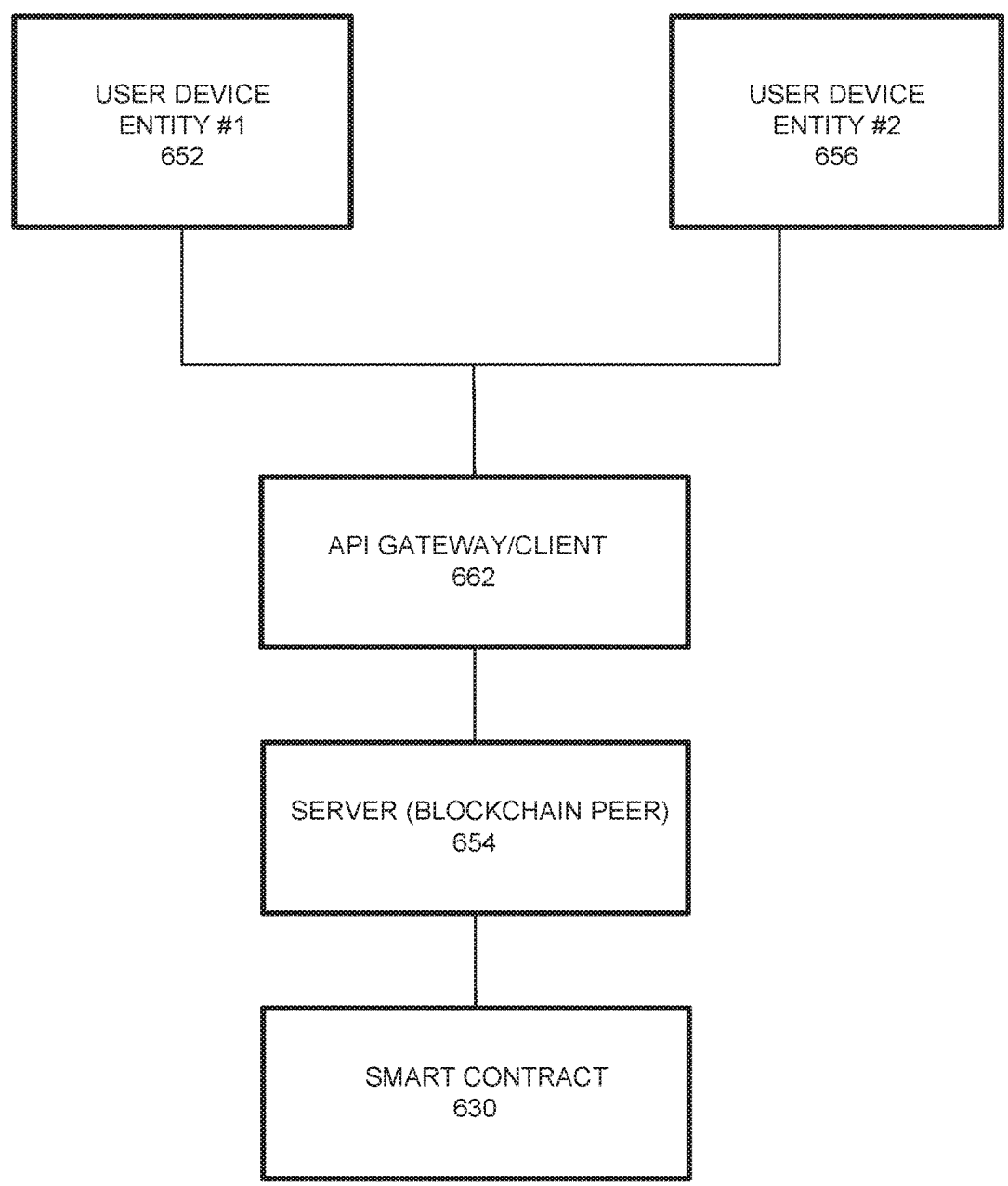
FIG. 6D illustrates yet another example system configured to utilize a blockchain, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
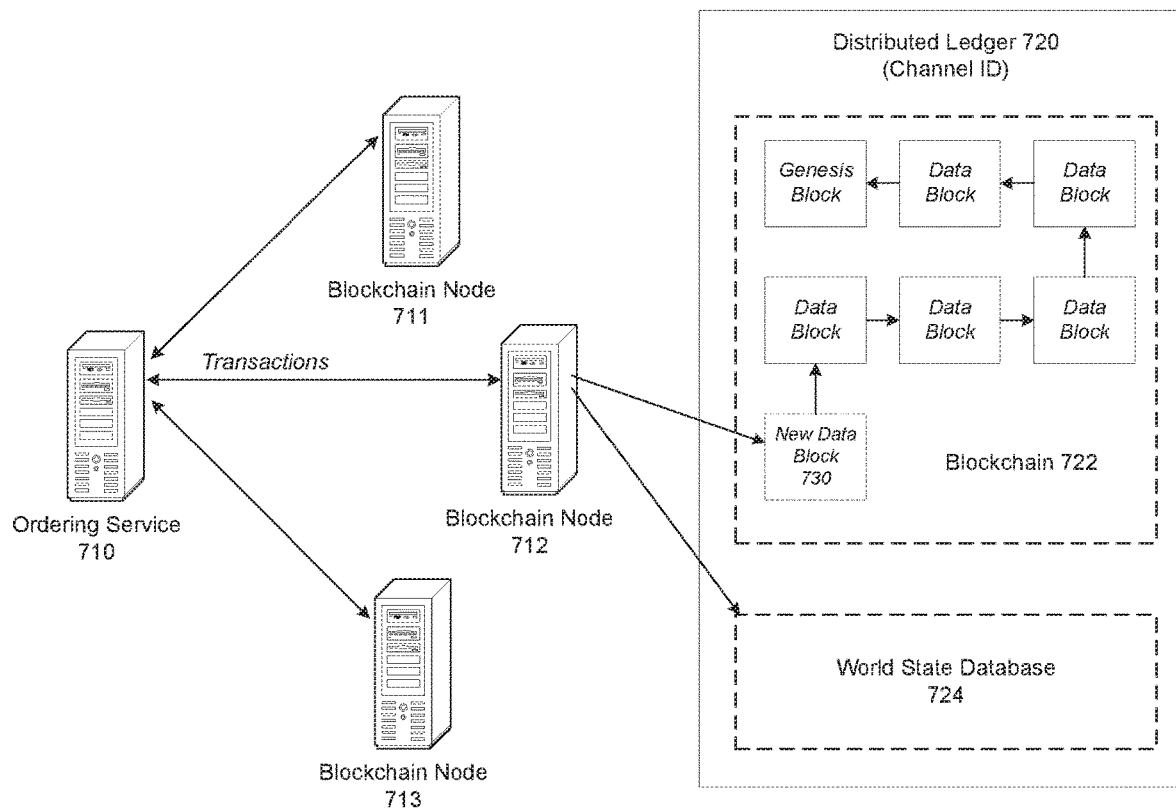
FIG. 7A illustrates a process for a new block being added to a distributed ledger, according to example embodiments.
Figure 7B:
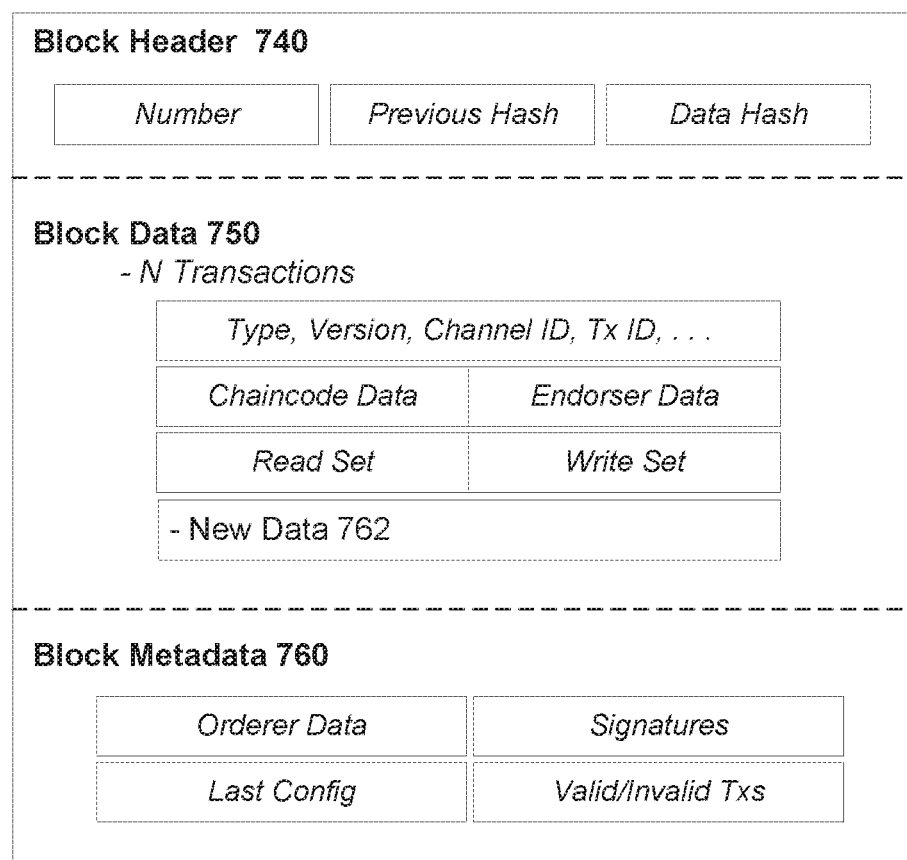
FIG. 7B illustrates contents of a new data block, according to example embodiments.

FIG. 7A illustrates a process 700 of a new block being added to a distributed ledger 720, according to example embodiments, and FIG. 7B illustrates contents of a new data block structure 730 for blockchain, according to example embodiments. Referring to FIG. 7A, clients (not shown) may submit transactions to blockchain nodes 711, 712, and/or 713. Clients may be instructions received from any source to enact activity on the blockchain 720. As an example, clients may be applications that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720. Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain which stores immutable, sequenced records in blocks, and a state database 724 (current world state) maintaining a current state of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 722 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys are stored in the state database 724. The state database 724 may include an indexed view into the transaction log of the blockchain 722, it can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data new data block 730 for storage on blockchain 720. The first block in the blockchain may be referred to as a genesis block which includes information about the blockchain, its members, the data stored therein, etc.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network.

When the ordering service 710 initializes a new data block 730, the new data block 730 may be broadcast to committing peers (e.g., blockchain nodes 711, 712, and 713). In response, each committing peer validates the transaction within the new data block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a new data block 730 (also referred to as a data block) that is stored on the blockchain 722 of the distributed ledger 720 may include multiple data segments such as a block header 740, block data 750, and block metadata 760. It should be appreciated that the various depicted blocks and their contents, such as new data block 730 and its contents. shown in FIG. 7B are merely examples and are not meant to limit the scope of the example embodiments. The new data block 730 may store transactional information of N transaction(s) (e.g., 1, 10, 100, 500, 1000, 2000, 3000, etc.) within the block data 750. The new data block 730 may also include a link to a previous block (e.g., on the blockchain 722 in FIG. 7A) within the block header 740. In particular, the block header 740 may include a hash of a previous block's header. The block header 740 may also include a unique block number, a hash of the block data 750 of the new data block 730, and the like. The block number of the new data block 730 may be unique and assigned in various orders, such as an incremental/sequential order starting from zero.

The block data 750 may store transactional information of each transaction that is recorded within the new data block 730. For example, the transaction data may include one or more of a type of the transaction, a version, a timestamp, a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 750 may also store new data 762 which adds additional information to the hash-linked chain of blocks in the blockchain 722. The additional information includes one or more of the steps, features, processes and/or actions described or depicted herein. Accordingly, the new data 762 can be stored in an immutable log of blocks on the distributed ledger 720. Some of the benefits of storing such new data 762 are reflected in the various embodiments disclosed and depicted herein. Although in FIG. 7B the new data 762 is depicted in the block data 750 but could also be located in the block header 740 or the block metadata 760.

The block metadata 760 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 712) may add validity/invalidity information based on an endorsement policy, verification of read/write sets, and the like. The transaction filter may include a byte array of a size equal to the number of transactions in the block data 750 and a validation code identifying whether a transaction was valid/invalid.

Figure 7C:
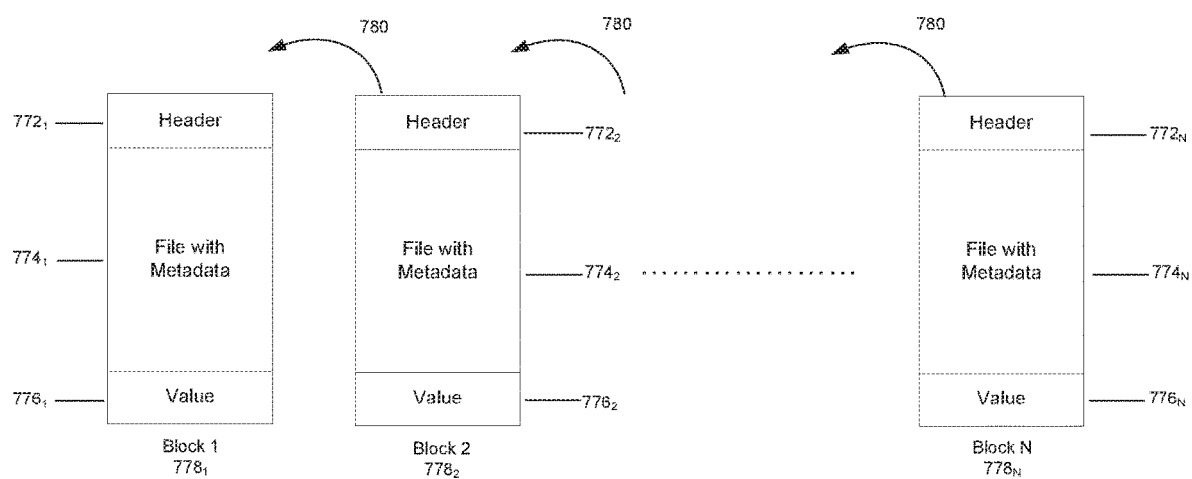
FIG. 7C illustrates a blockchain for digital content, according to example embodiments.

FIG. 7C illustrates an embodiment of a blockchain 770 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | . . . | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value . . . Content |
| . | . |
| . | . |
| . | . |
| Block N Hash Value | Block N Hash Value . . . Content |

In the example embodiment of FIG. 7C, the blockchain 770 includes a number of blocks $778_1$, $778_2$, . . . $778_N$ cryptographically linked in an ordered sequence, where N≥1. The encryption used to link the blocks $778_1$, $778_2$, . . . $778_N$ may be any of a number of keyed or un-keyed Hash functions. In one embodiment, the blocks $778_1$, $778_2$, . . . $778_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $778_1$, $778_2$, . . . , $778_N$ may be cryptographically linked by a function that is different from a hash function. For purposes of illustration, the following description is made with reference to a hash function, e.g., SHA-2.

Each of the blocks $778_1$, $778_2$, . . . , $778_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $778_1$ in the blockchain is referred to as the genesis block and includes the header $772_1$, original file $774_1$, and an initial value $776_1$. The hashing scheme used for the genesis block, and indeed in all subsequent blocks, may vary. For example, all the information in the first block $778_1$ may be hashed together and at one time, or each or a portion of the information in the first block $778_1$ may be separately hashed and then a hash of the separately hashed portions may be performed.

The header $772_1$ may include one or more initial parameters, which, for example, may include a version number, timestamp, nonce, root information, difficulty level, consensus protocol, duration, media format, source, descriptive keywords, and/or other information associated with original file $774_1$ and/or the blockchain. The header $772_1$ may be generated automatically (e.g., by blockchain network managing software) or manually by a blockchain participant. Unlike the header in other blocks $778_2$ to $778_N$ in the blockchain, the header $772_1$ in the genesis block does not reference a previous block, simply because there is no previous block.

The original file $774_1$ in the genesis block may be, for example, data as captured by a device with or without processing prior to its inclusion in the blockchain. The original file $774_1$ is received through the interface of the system from the device, media source, or node. The original file $774_1$ is associated with metadata, which, for example, may be generated by a user, the device, and/or the system processor, either manually or automatically. The metadata may be included in the first block $778_1$ in association with the original file $774_1$.

The value $776_1$ in the genesis block is an initial value generated based on one or more unique attributes of the original file $774_1$. In one embodiment, the one or more unique attributes may include the hash value for the original file $774_1$, metadata for the original file $774_1$, and other information associated with the file. In one implementation, the initial value $776_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $778_2$ to $778_N$ in the blockchain also have headers, files, and values. However, unlike the first block $772_1$, each of the headers $772_2$ to $772_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 780, to establish an auditable and immutable chain-of-custody.

Each of the header $772_2$ to $772_N$ in the other blocks may also include other information, e.g., version number, timestamp, nonce, root information, difficulty level, consensus protocol, and/or other parameters or information associated with the corresponding files and/or the blockchain in general.

The files $774_2$ to $774_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $776_2$ to $776_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 7D:
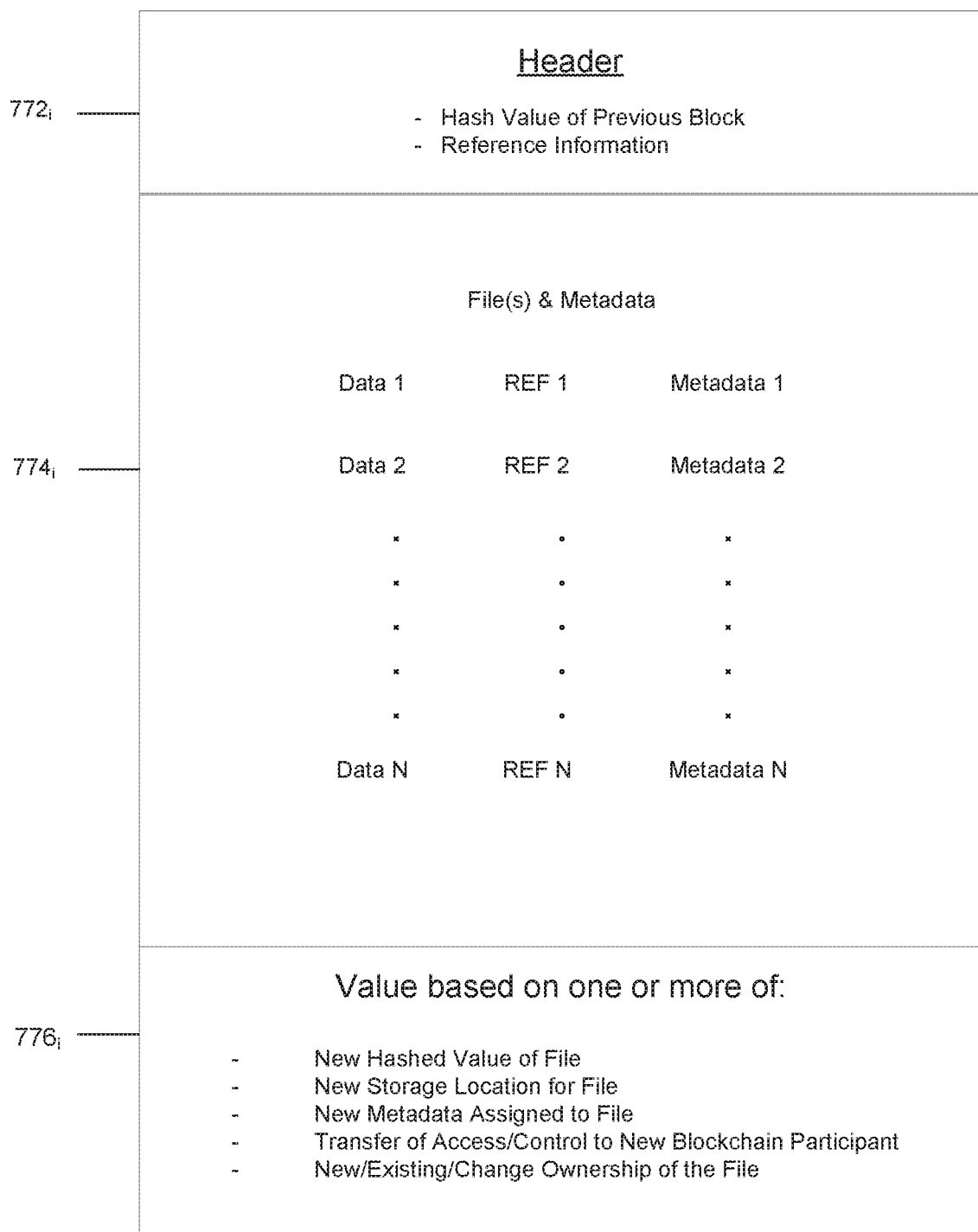
FIG. 7D illustrates a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 7D illustrates an embodiment of a block which may represent the structure of the blocks in the blockchain 790 in accordance with one embodiment. The block, $Block_i$, includes a header $772_i$, a file $774_i$, and a value $776_i$.

The header $772_i$ includes a hash value of a previous block $Block_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $774_i$ includes a plurality of data, such as Data 1, Data 2, . . . , Data N in sequence. The data are tagged with metadata Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, . . . , $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $776_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 770 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 8:
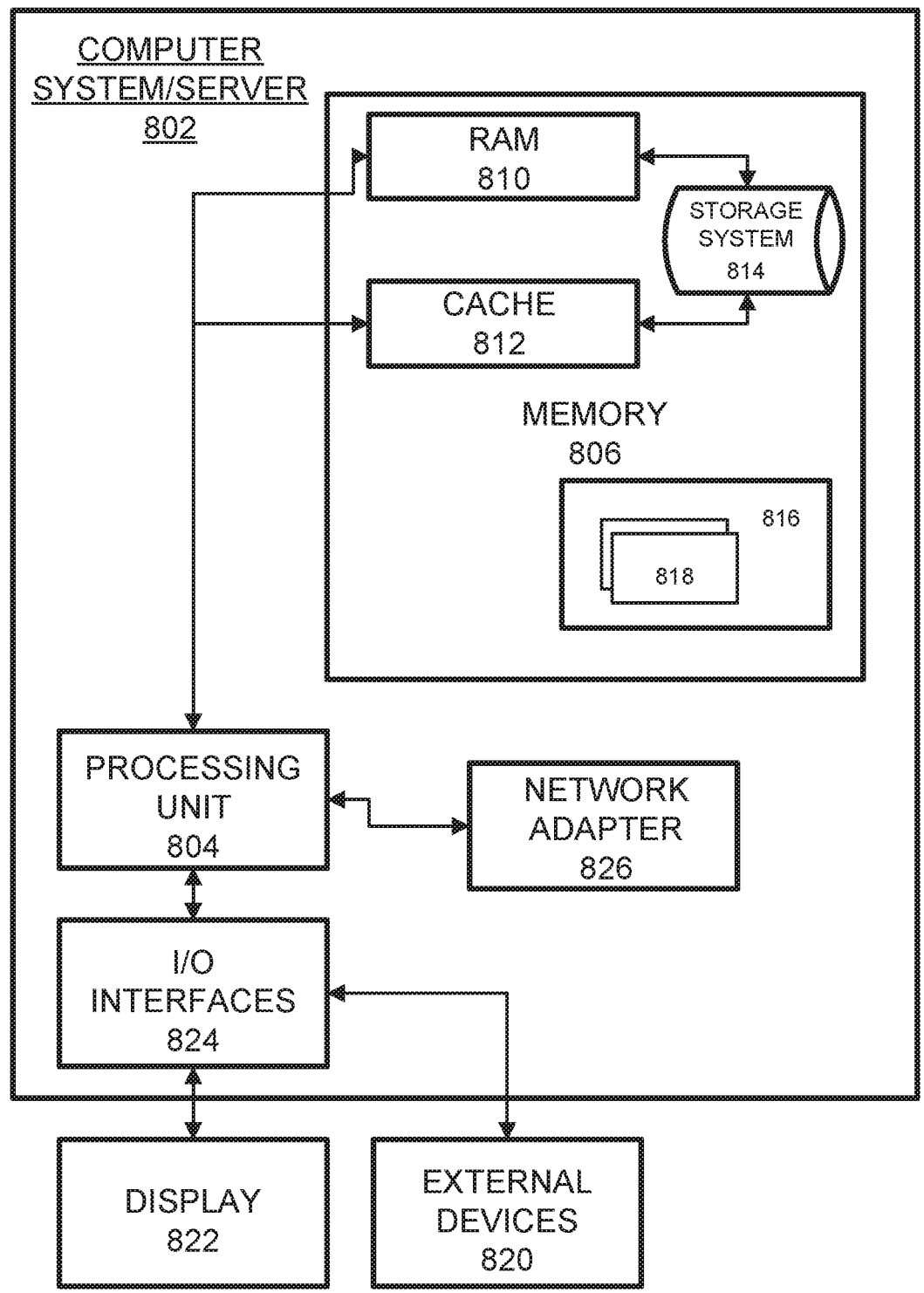
FIG. 8 illustrates an example system that supports one or more of the example embodiments.

FIG. 8 illustrates an example system 800 that supports one or more of the example embodiments described and/or depicted herein. The system 800 comprises a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
    a blockchain network, comprising:
        a shared ledger;
    one or more information technology systems protected by disaster recovery services, each comprising:
        one or more monitoring agents; and
    a disaster recovery orchestrator, configured to:
        receive configuration changes independent from a disaster recovery test schedule, from the one or more monitoring agents at each information technology system;
        analyze incremental configuration changes since a previous disaster recovery test for potential to limit a need for unnecessary disaster recovery retest;
        determine component level changes at each information technology system that impact disaster recovery test readiness;
        initiate a partial disaster recovery retest without regard to periodic disaster recovery test schedules, in response to incremental configuration changes that are at the information technology system component-level; and
        invoke a blockchain service to generate blockchain transactions to commit configuration changes, disaster recovery test actions, and disaster recovery test results to the shared ledger.

2. The system of claim 1, wherein the partial disaster recovery retest only tests parts of the information technology systems that are impacted by component level changes, wherein the partial disaster recovery retest does not test components not affected by an incremental configuration change.

3. The system of claim 2, wherein the blockchain service maintains different customer states for each of a plurality of customers in different blockchain networks where different customer-specific shared ledgers are maintained in each blockchain network.

4. The system of claim 2, wherein the disaster recovery orchestrator initiates the partial disaster recovery retest comprises the disaster recovery orchestrator further configured to:
    provide a notification to initiate partial disaster recovery retests that correspond to the incremental configuration changes, and in response a disaster recovery provider coupled to the disaster recovery orchestrator configured to:
        receive the notification to initiate partial disaster recovery retests;
        conduct the partial disaster recovery retest; and
        provide the disaster recovery test results to the disaster recovery orchestrator.

5. The system of claim 2, wherein the disaster recovery orchestrator is further configured to:
    provide a first notification to one or more customer devices to request approval to conduct the partial disaster recovery retest;
    receive a second notification from the one or more customer devices to one of:
        proceed with the partial disaster recovery retest;
        curtail the partial disaster recovery retest to exclude tests that may limit disaster recovery test effectiveness; or
        one of postpone or cancel the partial disaster recovery retest; and
    create a blockchain transaction comprising the second notification.

6. The system of claim 2, wherein the disaster recovery orchestrator is further configured to:
    detect, by a monitoring agent, that a configuration change important for disaster recovery test readiness may use an application or middleware-specific application programming interface to detect an operating system-level change.

7. The system of claim 2, wherein the disaster recovery orchestrator is further configured to:
    detect, by a monitoring agent, that a configuration change important for disaster recovery test readiness may use an operating system-based technique to detect an operating system-level change.

8. A method, comprising:
    receiving, by a disaster recovery orchestrator, configuration changes independent from a disaster recovery test schedule, from one or more monitoring agents at each of an information technology system;

analyzing incremental configuration changes since a previous disaster recovery test for potential to limit a need for unnecessary disaster recovery retest;

determining component level changes at each information technology system that impact disaster recovery test readiness;

initiating a partial disaster recovery retest without regard to periodic disaster recovery test schedules, in response to incremental configuration changes that are at the information technology system component-level; and invoking a blockchain service to generate blockchain transactions, the blockchain transactions committing configuration changes, disaster recovery testing actions, and disaster recovery testing results to a shared ledger of a blockchain network.

9. The method of claim 8, wherein the partial disaster recovery retest only tests parts of the information technology systems that are impacted by component-level changes, wherein the partial disaster recovery retest does not test components not affected by an incremental configuration change.

10. The method of claim 9, wherein the blockchain service maintains different customer states for each of a plurality of customers in different blockchain networks where different customer-specific shared ledgers are maintained in each blockchain network.

11. The method of claim 9, wherein initiating the partial disaster recovery retest comprising:
providing a notification, by the disaster recovery orchestrator, to initiate partial disaster recovery retests corresponding to the incremental configuration changes;
conducting the partial disaster recovery retest, by a disaster recovery provider receiving the notification to initiate partial disaster recovery retests; and
providing, by the disaster recovery provider, the disaster recovery testing results to the disaster recovery orchestrator.

12. The method of claim 9, further comprising:
providing a first notification requesting approval to conduct the partial disaster recovery retest to one or more customer devices;
receiving a second notification from the one or more customer devices to one of:
proceed with the partial disaster recovery retest;
curtail the partial disaster recovery retest to exclude tests that may limit disaster recovery testing effectiveness; or
one of postpone or cancel the partial disaster recovery retest; and
creating a blockchain transaction comprising the second notification.

13. The method of claim 9, further comprising:
detecting, by a monitoring agent, that a configuration change important for disaster recovery test readiness may use an application or middleware-specific application programming interface to detect an operating system-level change.

14. The method of claim 9, further comprising:
detecting, by a monitoring agent, that a configuration change important for disaster recovery test readiness may use an operating system-based technique to detect an operating system-level change.

15. A non-transitory computer readable medium comprising instructions, that when read by a processor, cause the processor to perform:
receiving, by a disaster recovery orchestrator, configuration changes independent from a disaster recovery test schedule, from one or more monitoring agents at each of an information technology system;
analyzing incremental configuration changes since a previous disaster recovery test for potential to limit a need for unnecessary disaster recovery retest;
determining component level changes at each information technology system that impact disaster recovery test readiness;
initiating a partial disaster recovery retest without regard to periodic disaster recovery test schedules, in response to the incremental configuration changes that are at the information technology system component-level; and
invoking a blockchain service to generate blockchain transactions, the blockchain transactions committing configuration changes, disaster recovery testing actions, and disaster recovery testing results to a shared ledger of a blockchain network.

16. The non-transitory computer readable medium of claim 15, wherein the partial disaster recovery retest only tests parts of the information technology systems that are impacted by component level changes, wherein the partial disaster recovery retest does not test components not affected by an incremental configuration change, wherein the blockchain service maintains different customer states for each of a plurality of customers in different blockchain networks where different customer-specific shared ledgers are maintained in each blockchain network.

17. The non-transitory computer readable medium of claim 16, wherein initiating the partial disaster recovery retest comprising:
providing a notification, by the disaster recovery orchestrator, to initiate partial disaster recovery retests corresponding to the incremental configuration changes;
conducting the partial disaster recovery retest, by a disaster recovery provider receiving the notification to initiate partial disaster recovery retests; and
providing, by the disaster recovery provider, the disaster recovery testing results to the disaster recovery orchestrator.

18. The non-transitory computer readable medium of claim 16, wherein the instructions cause the processor to further perform:
providing a first notification requesting approval to conduct the partial disaster recovery retest to one or more customer devices;
receiving a second notification from the one or more customer devices to one of:
proceed with the partial disaster recovery retest;
curtail the partial disaster recovery retest to exclude tests that may limit disaster recovery testing effectiveness; or
one of postpone or cancel the partial disaster recovery retest; and
creating a blockchain transaction comprising the second notification.

19. The non-transitory computer readable medium of claim 16, wherein the instructions cause the processor to further perform:
detecting, by a monitoring agent, that a configuration change important for disaster recovery test readiness may use an application or middleware-specific application programming interface to detect an operating system-level change.

20. The non-transitory computer readable medium of claim 16, wherein the instructions cause the processor to further perform:

detecting, by a monitoring agent, that a configuration change important for disaster recovery test readiness may use an operating system-based technique to detect an operating system-level change.

\* \* \* \* \*